(12) United States Patent
Fife

(10) Patent No.: US 10,942,531 B1
(45) Date of Patent: Mar. 9, 2021

(54) SWIMMING POOL LEVELING SYSTEM AND METHOD OF USE

(71) Applicant: Taylor Fife, Santa Cruz, CA (US)

(72) Inventor: Taylor Fife, Santa Cruz, CA (US)

( * ) Notice: Subject to any disclaimer, the term of this patent is extended or adjusted under 35 U.S.C. 154(b) by 0 days.

(21) Appl. No.: 16/508,988

(22) Filed: Jul. 11, 2019

Related U.S. Application Data

(60) Provisional application No. 62/697,633, filed on Jul. 13, 2018.

(51) Int. Cl.
*G05D 7/01* (2006.01)
*E04H 4/14* (2006.01)

(52) U.S. Cl.
CPC .............. *G05D 7/0166* (2013.01); *E04H 4/14* (2013.01); *Y10T 137/7413* (2015.04)

(58) Field of Classification Search
CPC .......... E04H 4/12; E04H 4/14; G05D 7/0166; G05D 9/12; F16K 31/18; F16K 31/20; F16K 31/22; F16K 31/30; F16K 33/00; Y10T 137/731; Y10T 137/7358; Y10T 137/7413; Y10T 137/7439
See application file for complete search history.

(56) References Cited

U.S. PATENT DOCUMENTS

| | | | | |
|---|---|---|---|---|
| 3,739,405 A | * | 6/1973 | Schmidt | E04H 4/12 4/508 |
| 3,837,015 A | * | 9/1974 | Whitaker | G05D 9/02 4/508 |
| 3,848,616 A | * | 11/1974 | Sanner | G01F 23/241 137/78.5 |
| 3,848,627 A | * | 11/1974 | Page | G01F 23/241 137/392 |
| 3,893,470 A | * | 7/1975 | MacPhee | G05D 9/12 137/101.27 |
| 3,908,206 A | * | 9/1975 | Grewing | E04H 4/12 4/508 |
| 3,997,925 A | * | 12/1976 | Hough | E04H 4/12 4/508 |
| 4,069,405 A | * | 1/1978 | Fima | G01F 23/70 200/84 C |
| 4,080,985 A | * | 3/1978 | Eagle | F16K 31/18 137/386 |

(Continued)

FOREIGN PATENT DOCUMENTS

GB 2302162 A * 1/1997 ............... E04H 4/12

*Primary Examiner* — Marina A Tietjen
*Assistant Examiner* — Frederick D Soski
(74) *Attorney, Agent, or Firm* — Richard Eldredge; Eldredge Law Firm

(57) ABSTRACT

A swimming pool leveling system includes a bracket extending from a first end to a second end, the bracket having openings; a float valve having a body with a float positioned within an interior of the body, the float valve engaged with the bracket via an adjustment device; a pressure reducing valve engaged with the body and to receive a water source; and a base having a base body with an enclosed interior accessible via an opening, the enclosed interior configured to receive a weight, the base having knobs protruding from an end to engage with the openings to secure the base to the bracket; the base is to rest on a surface such that the bracket extends the float valve into a pool; and the float valve to allow filling of the pool to a desired height.

5 Claims, 9 Drawing Sheets

(56) References Cited

U.S. PATENT DOCUMENTS

| | | | | |
|---|---|---|---|---|
| 4,194,691 A * | 3/1980 | Birnbach | A01G 25/167 239/63 |
| 4,227,266 A * | 10/1980 | Russell | E04H 4/12 137/362 |
| 4,265,598 A * | 5/1981 | Brand | E04H 4/12 200/84 R |
| 4,342,125 A * | 8/1982 | Hodge | E04H 4/12 137/430 |
| 4,361,038 A * | 11/1982 | Schuler | G01F 23/22 137/392 |
| 4,380,091 A * | 4/1983 | Lively | E04H 4/12 137/386 |
| 4,418,569 A * | 12/1983 | Kuhnel | G01F 23/266 324/678 |
| 4,491,146 A * | 1/1985 | Sveds | F22B 1/284 137/341 |
| 4,574,405 A * | 3/1986 | Tams | E04H 4/12 137/428 |
| 4,591,839 A * | 5/1986 | Charboneau | G01F 23/246 340/620 |
| 4,592,098 A * | 6/1986 | Magnes | E04H 4/12 137/389 |
| 4,655,243 A * | 4/1987 | Keller | E04H 4/1218 137/403 |
| 4,686,718 A * | 8/1987 | Kinkead | E04H 4/1209 137/428 |
| 4,706,310 A * | 11/1987 | Magnes | E04H 4/1272 4/508 |
| 4,724,552 A * | 2/1988 | Kinkead | E04H 4/1209 4/508 |
| 4,735,230 A * | 4/1988 | Detloff | E03D 1/00 137/15.26 |
| 4,823,987 A * | 4/1989 | Switall | B01F 3/088 137/101.25 |
| 4,853,986 A * | 8/1989 | Allen | E04H 4/12 4/508 |
| 4,888,989 A * | 12/1989 | Homer | G01F 23/266 73/304 C |
| 5,035,583 A * | 7/1991 | Vaught | F04D 9/041 417/200 |
| 5,103,368 A * | 4/1992 | Hart | G01F 23/268 361/284 |
| 5,154,205 A * | 10/1992 | Langill | E04H 4/12 137/393 |
| 5,203,038 A * | 4/1993 | Gibbs | E04H 4/12 4/508 |
| 5,253,374 A * | 10/1993 | Langill | G05D 9/12 239/407 |
| 5,315,873 A * | 5/1994 | Jin | G01F 23/003 73/309 |
| 5,365,617 A * | 11/1994 | Tarr | E04H 4/12 137/392 |
| 5,367,723 A * | 11/1994 | Pleva | E04H 4/12 137/428 |
| 5,427,136 A * | 6/1995 | Weishew | B41F 31/022 101/364 |
| 5,459,886 A * | 10/1995 | Payne | E04H 4/1209 137/414 |
| 5,596,773 A * | 1/1997 | Cueman | E04H 4/12 4/496 |
| 5,624,238 A * | 4/1997 | Herbert | A62C 25/00 417/234 |
| 5,655,232 A * | 8/1997 | Buckwalter | E04H 4/12 137/403 |
| 5,730,861 A * | 3/1998 | Sterghos | B01D 21/0012 210/86 |
| 5,790,991 A * | 8/1998 | Johnson | E04H 4/12 137/423 |
| 5,836,022 A * | 11/1998 | Busenga | E04H 4/12 4/508 |
| 5,878,447 A * | 3/1999 | Mogab | E04H 4/12 4/508 |
| 5,975,102 A * | 11/1999 | Schalk | G01F 23/2965 137/2 |
| 5,992,447 A * | 11/1999 | Miller | E04H 4/12 137/386 |
| 6,000,425 A * | 12/1999 | Steinorth | E04H 4/12 137/391 |
| 6,006,605 A * | 12/1999 | Sulollari | G01F 23/36 73/306 |
| 6,035,879 A * | 3/2000 | Campbell | E03D 1/32 137/15.08 |
| 6,223,359 B1 * | 5/2001 | Oltmanns | E04H 4/12 137/392 |
| 6,532,814 B2 * | 3/2003 | Bromley | G01M 3/3245 73/290 R |
| 6,611,968 B1 * | 9/2003 | Swanson | E04H 4/12 239/20 |
| 6,625,824 B1 * | 9/2003 | Lutz | E04H 4/12 137/625.21 |
| 6,964,278 B2 * | 11/2005 | Tschanz | G01F 23/02 137/386 |
| 7,003,817 B1 * | 2/2006 | Pansini | E04H 4/12 137/426 |
| 7,249,506 B2 * | 7/2007 | Scardovi | G01F 23/261 324/663 |
| 7,343,794 B1 * | 3/2008 | Pucel | G01F 1/002 73/215 |
| 7,481,105 B2 * | 1/2009 | Schillinger | G01F 23/2962 73/290 B |
| 7,690,054 B1 * | 4/2010 | Pansini | E04H 4/12 4/508 |
| 7,959,273 B2 * | 6/2011 | Yajima | B41J 2/17566 347/86 |
| 8,209,794 B1 * | 7/2012 | Harrison | G05D 9/12 4/508 |
| 8,220,482 B1 * | 7/2012 | DeVerse | G01M 3/3245 137/412 |
| 8,266,737 B1 * | 9/2012 | Goettl | E04H 4/12 4/508 |
| 8,770,218 B2 * | 7/2014 | Tagami | F16K 31/18 137/202 |
| 9,068,369 B1 * | 6/2015 | Goettl | E04H 4/00 |
| 9,410,336 B2 * | 8/2016 | DeVerse | E04H 4/12 |
| 10,337,201 B2 * | 7/2019 | Thomson | F16K 21/185 |
| 10,711,474 B1 * | 7/2020 | Rickerson | E04H 4/12 |
| 2003/0221250 A1 * | 12/2003 | Gibson | E04H 4/12 4/508 |
| 2004/0035465 A1 * | 2/2004 | Cazden | E04H 4/12 137/392 |
| 2004/0187203 A1 * | 9/2004 | Gibson | E04H 4/12 4/508 |
| 2004/0205885 A1 * | 10/2004 | Gardner | E04H 4/12 4/507 |
| 2006/0070174 A1 * | 4/2006 | Pansini | E04H 4/12 4/507 |
| 2006/0096659 A1 * | 5/2006 | Reusche | A01K 7/02 141/198 |
| 2008/0144238 A1 * | 6/2008 | Cline | A61H 33/60 361/42 |
| 2009/0151796 A1 * | 6/2009 | Buchtel | F16K 31/26 137/434 |
| 2009/0165202 A1 * | 7/2009 | Morrison | E04H 4/12 4/508 |
| 2009/0260149 A1 * | 10/2009 | Booth | E04H 4/14 4/508 |
| 2010/0071123 A1 * | 3/2010 | Larsen | E04H 4/12 4/508 |
| 2010/0314328 A1 * | 12/2010 | Bizon | E03D 1/30 210/744 |
| 2011/0120219 A1 * | 5/2011 | Barlesi | G01F 23/268 73/304 C |
| 2011/0185808 A1 * | 8/2011 | Arndt | G01F 23/266 73/304 C |
| 2013/0247293 A1 * | 9/2013 | Jeronimus | E04H 4/14 4/508 |
| 2015/0211248 A1 * | 7/2015 | Nicol | E04H 4/12 4/507 |

(56) References Cited

U.S. PATENT DOCUMENTS

2015/0227145 A1* 8/2015 Reddy .................... B05B 17/08
                                                    137/391
2018/0065839 A1* 3/2018 Hogshead ............... F16K 21/18
2020/0131792 A1* 4/2020 Litteral .................. F16K 31/18

* cited by examiner

SWIMMING POOL LEVELING SYSTEM AND METHOD OF USE

BACKGROUND

1. Field of the Invention

The present invention relates generally to swimming pools, and more specifically, to a pool leveling system that provides for automatic shut off of a water source for convenient pool filling to a desired level.

2. Description of Related Art

Pools are well known in the art and are effective means of entertainment and recreation. It is a common that pools require the user to add water from time to time to make up for water loss. A common practice is shown in FIG. 1, flowchart 101, wherein the pool loses water due to evaporation and water being splashed out, or alternatively the pool requires initial filling, as shown with box 103. The user can then proceed to add water via a hose or other water source, as shown with box 105. The user then turns the water off when a desired level is reached, as shown with boxes 107, and 109.

One of the problems commonly associated with system 101 is inaccuracy and inefficiency. For example, the user must either monitor the water source constantly to turn off when the desired level is reached, or they may risk the water overflowing.

Accordingly, although great strides have been made in the area of pool filling systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
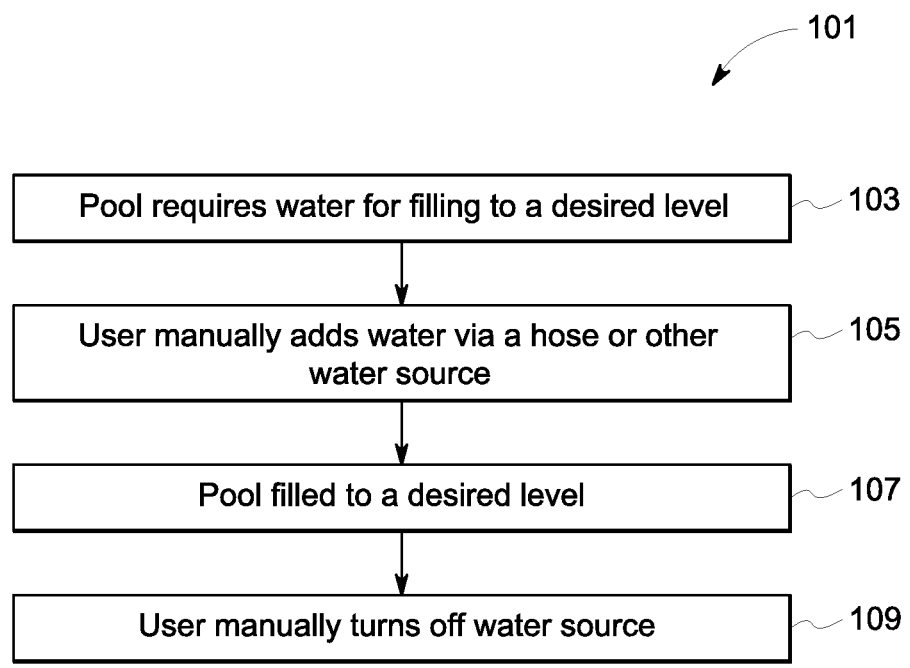
FIG. 1 is a flowchart of a common method of adding water to a pool.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional pool filling systems. Specifically, the present invention provides for a convenient pool filling system that uses a float valve to shut off the water as needed to maintain a desired height. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
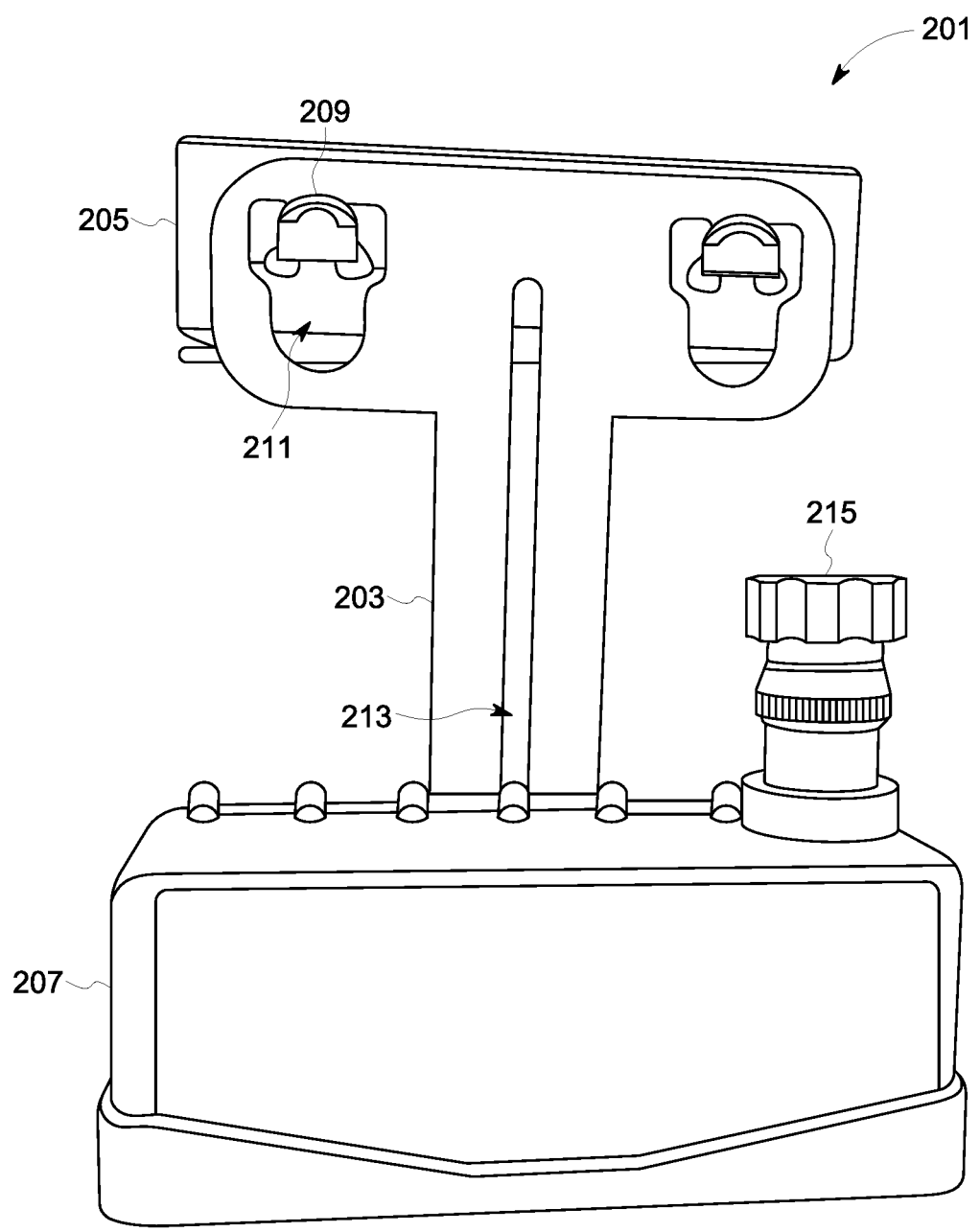
FIG. 2 is a front view of a swimming pool leveling system in accordance with a preferred embodiment of the present application.

Referring now to the drawings wherein like reference characters identify corresponding or similar elements throughout the several views, FIG. 2 depicts a front view of a swimming pool leveling system 201 in accordance with a preferred embodiment of the present application. It will be appreciated that system 201 overcomes one or more of the above-listed problems commonly associated with conventional pool filling systems.

In the contemplated embodiment, system 201 includes a bracket 203 configured to attach to a base 205 and a float valve 207. As shown, in one embodiment, the bracket 203 engaged with one or more knobs 209 that extend from an exterior surface of the base 205 and connect with one or more openings 211 through the bracket. The bracket 203 further including a channel 213 that extends through a thickness of the bracket and provides for adjustability, as will be discussed herein. In the preferred embodiment, a pressure relief valve 215 is configured to connect to a water source, such as a hose.

Figure 3:
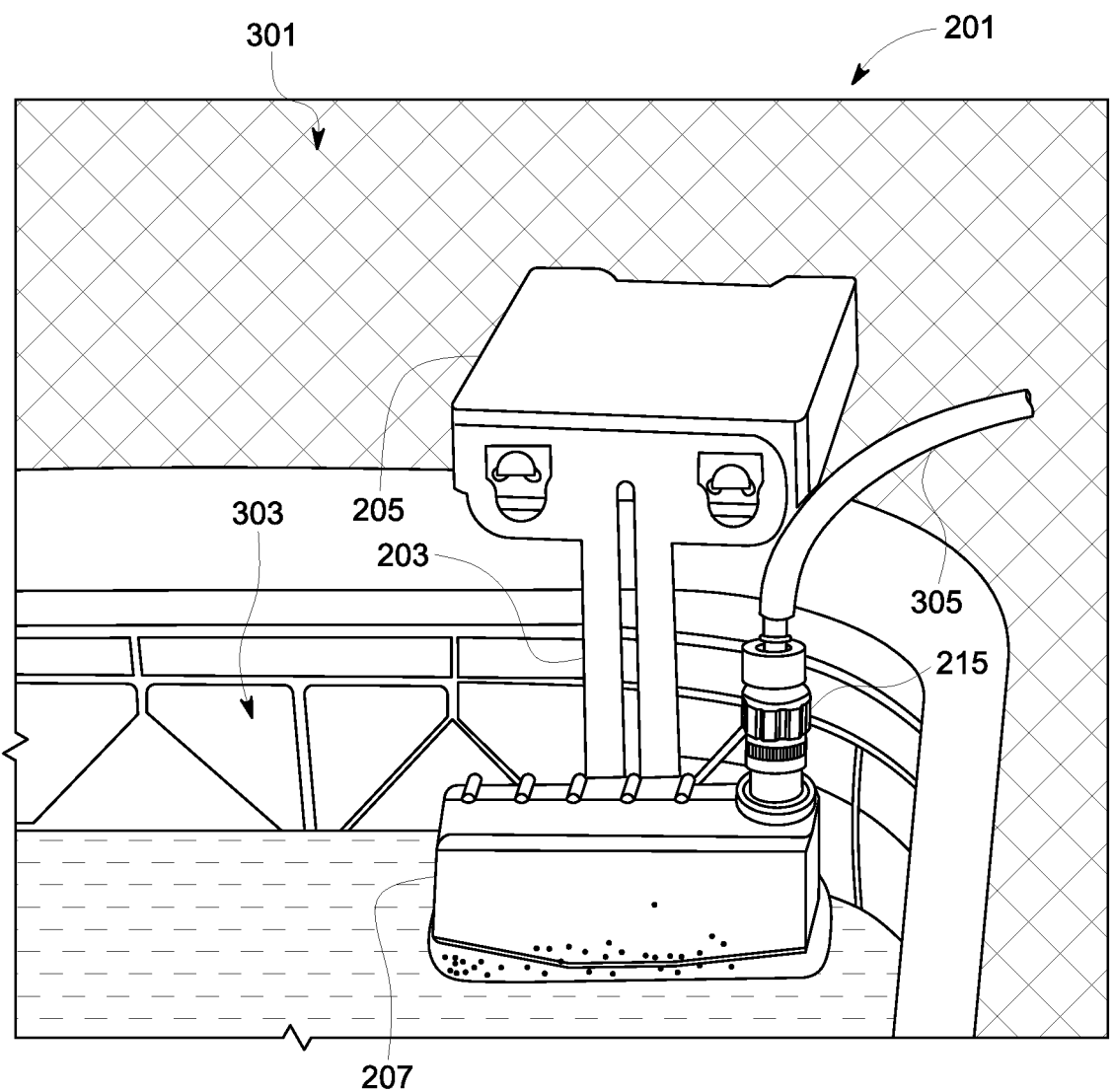
FIG. 3 is an isometric view of the system of FIG. 2 engaged with a water source and a pool in accordance with the present application.

As shown in FIG. 3, the base 205 is configured to rest on a ground surface 301, such that the bracket 203 extends the float valve 207 into the pool 303. A hose 305 is configured to connect to the pressure relief valve 215 to fill the pool to a desired level.

Figure 4:
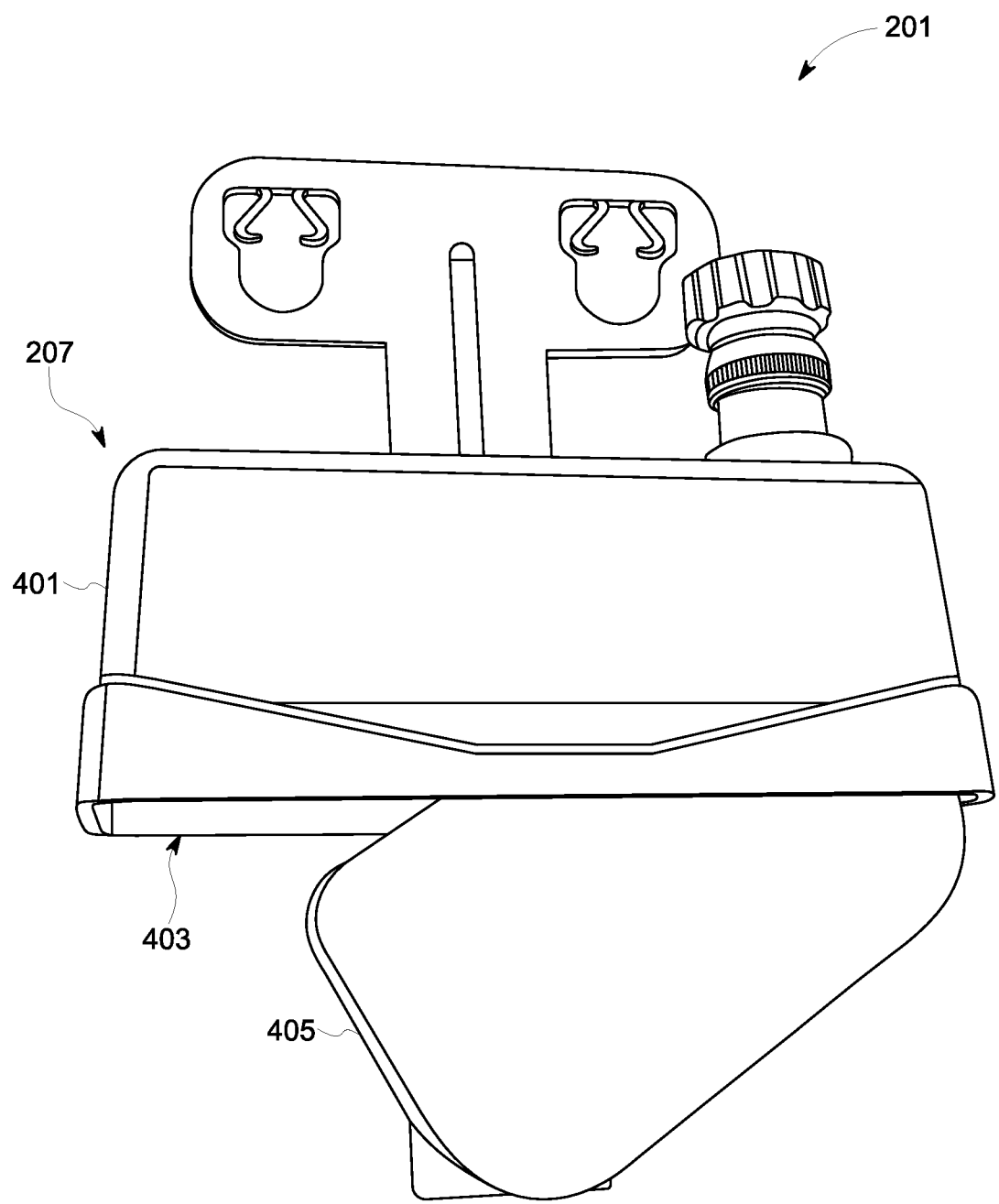
FIG. 4 is an isometric view of the float valve of FIG. 2.

In FIG. 4, the float valve 207 is shown in better detail. As shown, the float valve 207 includes a body 401 that creates an interior area 403 wherein the float 405 is housed.

Figure 5:
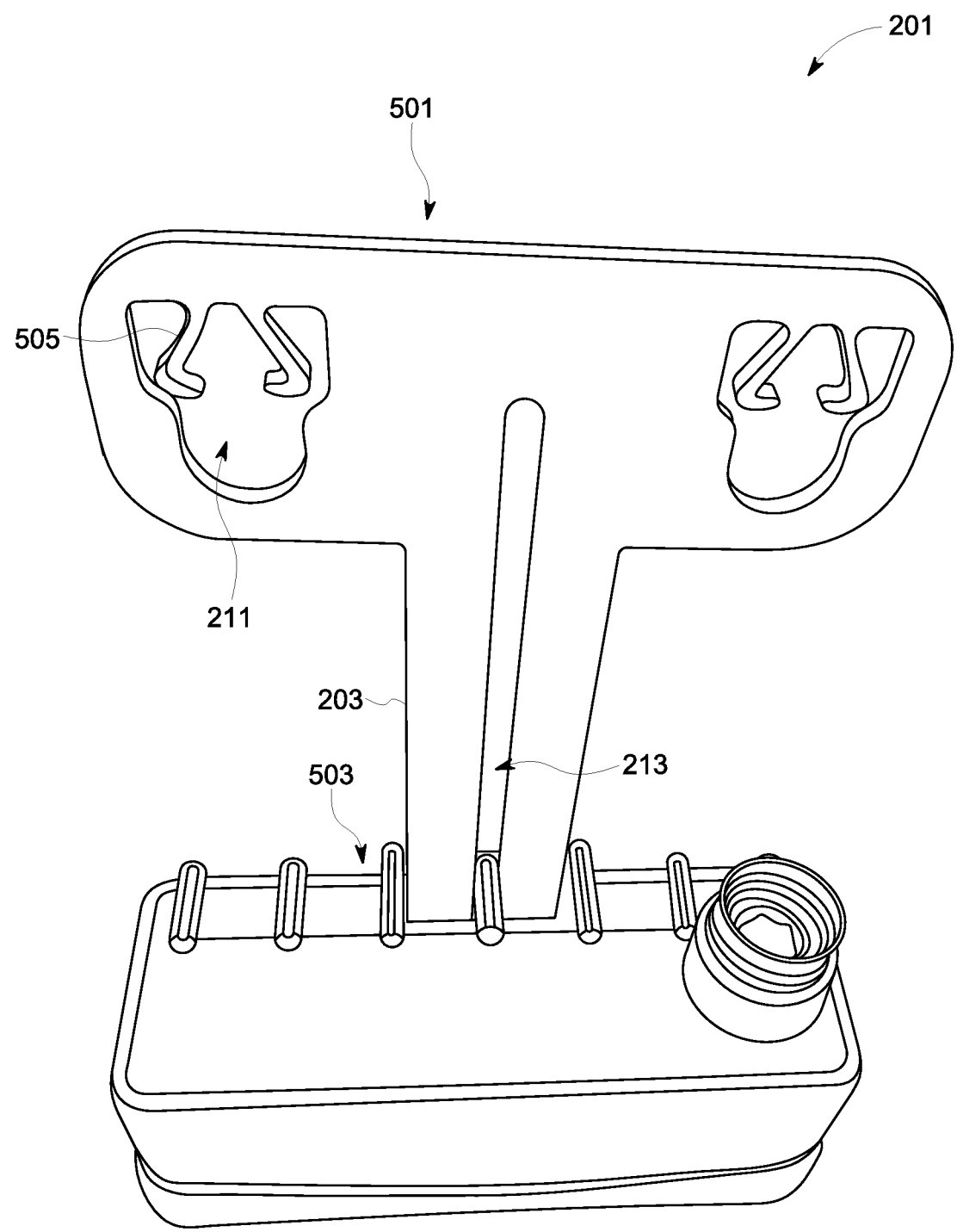
FIG. 5 is a top isometric view of the bracket of FIG. 2.

In FIG. 5, the bracket 203 is shown in more detail. The bracket 203 extending from a first end 501 to a second end 503, wherein the first end 503 includes the one or more openings 211. As shown, in the preferred embodiment, each opening contains a triangular shaped clip 505 configured to releasably engage with the knobs of the base, thereby providing for easy attachment of the bracket to the base.

Figure 6:
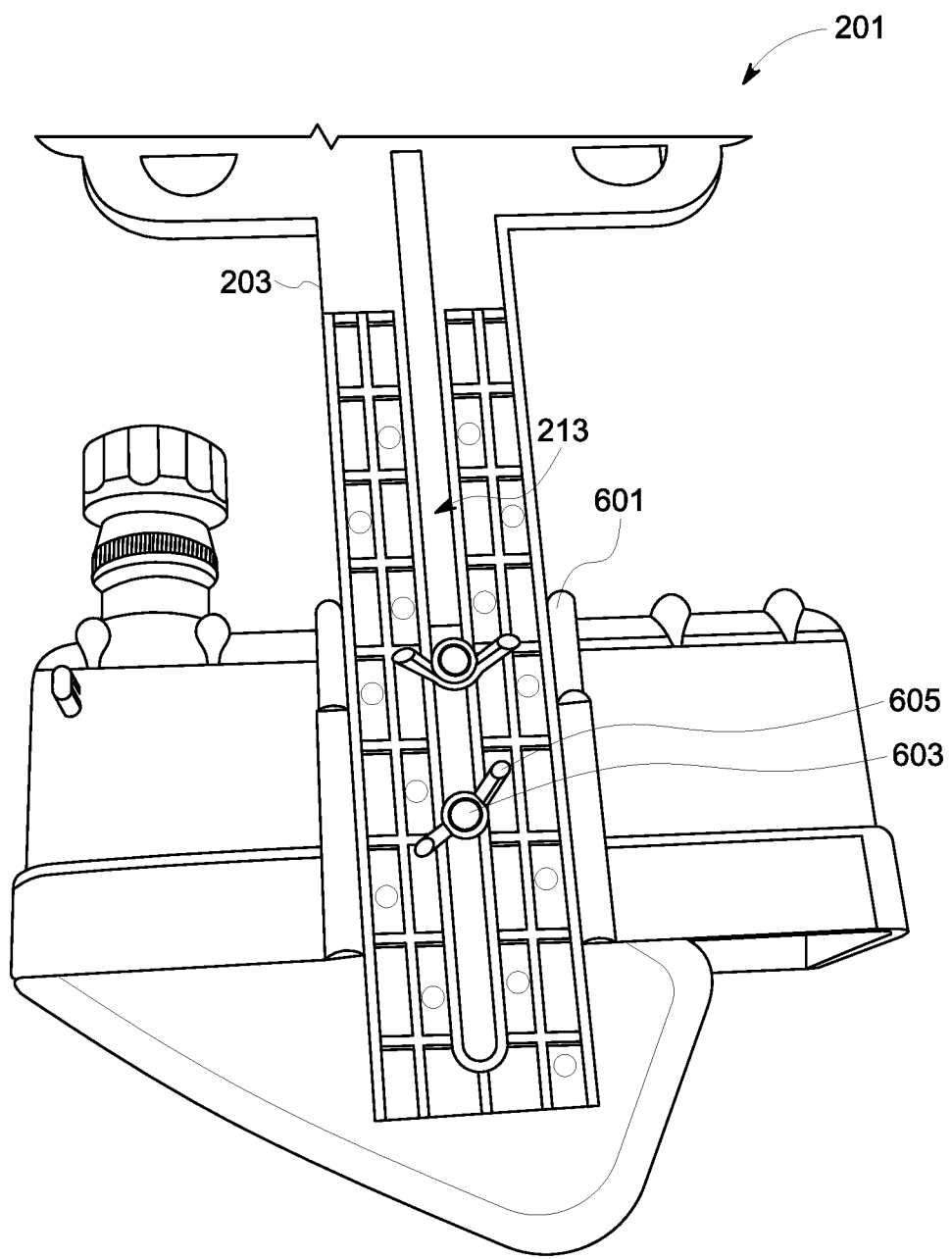
FIG. 6 is a back view of the bracket engaging with the float valve of FIG. 2.

In FIG. 6, the adjustment device 601 configured to adjust a position of the float valve relative to the bracket 203 is shown. The adjustment device 601 can include one or more bolts 603 extending from a surface of the float valve body and configured to extend through the channel 213 and secure in place via one or more nuts 605. It should be appreciated that various other configurations could be used.

Figure 7:
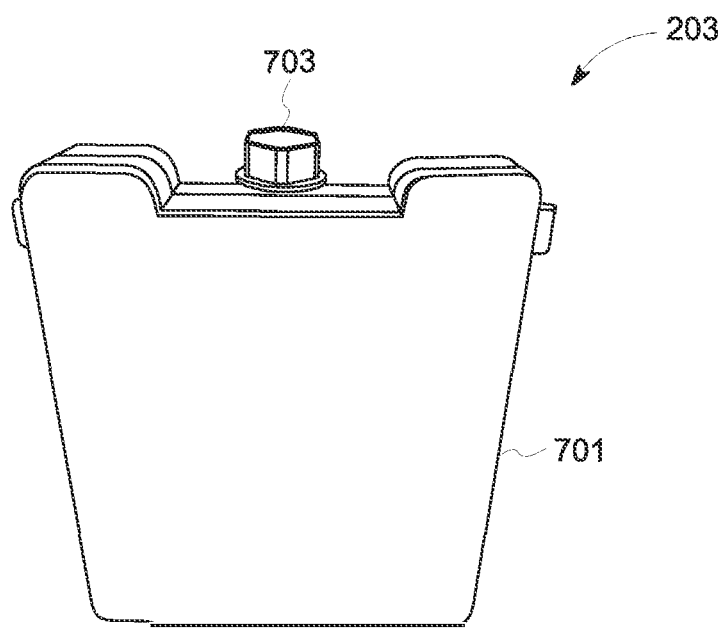
FIG. 7 is a top view of the base of FIG. 2.

In FIG. 7, a top view depicts base 205. As shown, the base 205 includes a base body 701 with an enclosed interior area accessible via an opening 703. The base 205 is configured to receive a weight, such as water or sand, thereby weighing down the system.

Figure 8:
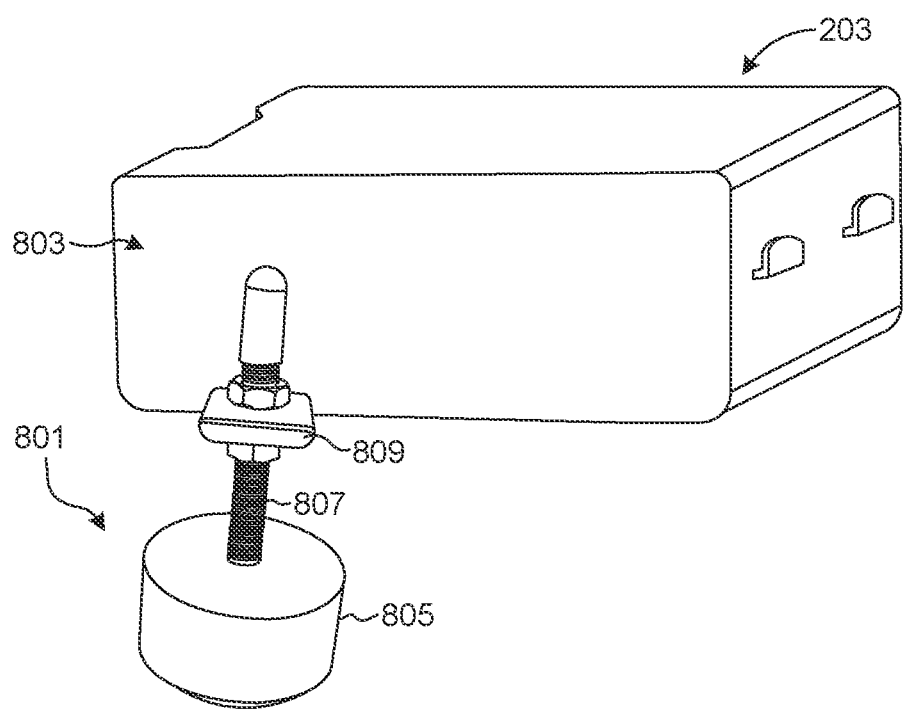
FIG. 8 is a back view of the base of FIG. 2.

In FIG. 8, a back view depicts an adjustable foot 801 attached to a side 803 of the base 203. As shown, the adjustable foot 801 can include a foot portion 805 attached to a threaded rod 807 which extends through a lip 809. The user can use the one or more feet of the system to raise and lower an end of the base. This feature allows for the user to level the base relative to the surface, such as when the surface is sloped away from the pool.

Figure 9:
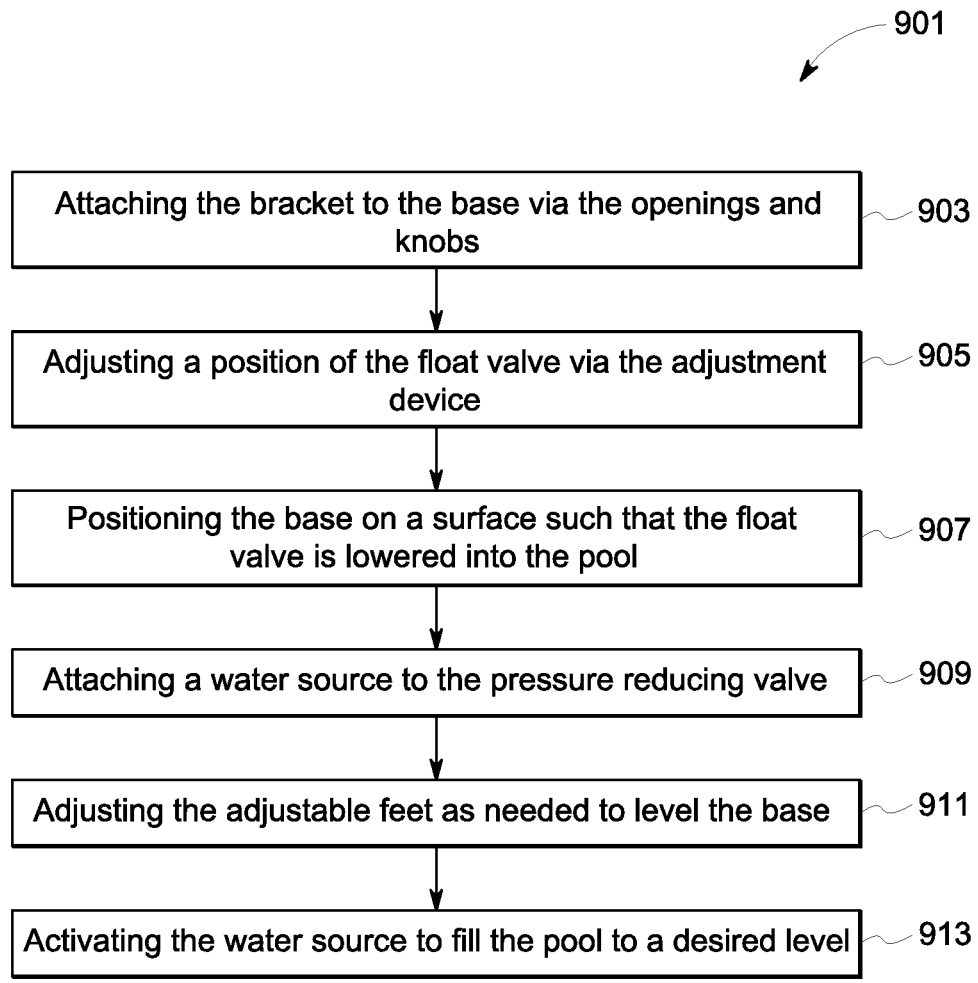
FIG. 9 is a flowchart of the method of use of the system of FIG. 2.

In FIG. 9, a flowchart 901 depicts a method of use of the system 201. During use, the user attaches the bracket to the base and adjusts a position of the float valve as desired, as shown with boxes 903, 905. The base is positioned on a surface such that the float valve is lowered into the pool, as shown with box 907. The user can proceed with attaching a water source to the pressure relief valve and adjusting the feet as necessary to level the base, as shown with boxes 909, 911. The water source is activated to fill the pool to a desired level, as shown with box 913.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A swimming pool leveling system, comprising:
   a bracket extending from a first end to a second end, the bracket having at least two articulate openings at the first end;
   at least two triangular shaped clips positioned within the at least two articulate openings, the at least two triangular clips each having an open end;
   a float valve having a body with a float positioned within an interior of the body, the float valve engaged with the bracket via an adjustment device at the second end of the bracket;
   a pressure reducing valve engaged with the body and configured to receive a water source; and
   a base having a base body with an enclosed interior accessible via an opening, the enclosed interior configured to receive a weight, the base having at least two knobs engaged with the bracket via engagement with the at least two triangular clips via the open ends of the at least two triangular clips;
   wherein the base is configured to rest on a surface such that the bracket extends the float valve into a pool; and
   wherein the float valve is configured to allow filling of the pool to a desired height, wherein the float valve shuts off the water source upon the water reaching the desired height.

2. The system of claim 1, wherein the adjustment device comprises:
   a channel extending through a thickness of the bracket;
   one or more bolts extending from a back of the float valve body, the one or more bolts configured to extend through the channel; and
   one or more nuts configured to secure the bolts within a position along the channel.

3. A method of raising water in a pool, the method comprising:
   providing the system of claim 1;
   attaching the bracket to the base via the at least two articulate openings and the at least two knobs engaging with the at least two triangular shaped clips;
   positioning the base on the surface such that the float valve is lowered into the pool;
   attaching the water source to the pressure reducing valve; and
   activating the water source; and
   wherein the float valve shuts off the water source when the water reaches the desired level.

4. The method of claim 3, further comprising:
   raising an end of the base via one or more adjustable feet to level the base relative to the surface.

5. The method of claim 3, further comprising:
   adjusting a position of the float valve via the bracket and adjustment device.

* * * * *